(12) United States Patent
Woollums et al.

(10) Patent No.: US 8,616,521 B2
(45) Date of Patent: Dec. 31, 2013

(54) FAIL SAFE RETAINING PLUG ASSEMBLY FOR A SLAM-SHUT SAFETY DEVICE

(75) Inventors: David E. Woollums, Frisco, TX (US);
Tung Nguyen, McKinney, TX (US);
James C. Hawkins, Allen, TX (US);
Roman Alexandru-Vlad, Cluj-Napoca (RO)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 130 days.

(21) Appl. No.: 13/087,771

(22) Filed: Apr. 15, 2011

(65) Prior Publication Data
US 2012/0261604 A1    Oct. 18, 2012

(51) Int. Cl.
*F16K 31/44* (2006.01)
*F16K 31/00* (2006.01)

(52) U.S. Cl.
USPC ............ 251/73; 137/624.27; 251/74; 251/77

(58) Field of Classification Search
USPC ........... 137/330, 356, 624.27; 251/66, 73, 74, 251/77, 79, 81, 84, 85
See application file for complete search history.

(56) References Cited

U.S. PATENT DOCUMENTS

| | | | | |
|---|---|---|---|---|
| 922,433 A | * | 5/1909 | Kieser | 137/49 |
| 2,689,006 A | * | 9/1954 | Lindsay | 74/3.54 |
| 2,925,987 A | * | 2/1960 | Priesmeyer | 251/61.4 |
| 3,080,952 A | * | 3/1963 | Carlstedt | 477/8 |
| 4,318,530 A | * | 3/1982 | Lissmyr et al. | 251/54 |
| 4,526,340 A | * | 7/1985 | Kolchinsky et al. | 251/38 |
| 2008/0257420 A1 | | 10/2008 | Faillat et al. | |

FOREIGN PATENT DOCUMENTS

EP  1 942 295 A2  7/2008
GB  2 297 605 A   8/1996

OTHER PUBLICATIONS

International Search Report for PCT/US2012/030795, mailed May 29, 2012.
Written Opinion for PCT/US2012/030795, mailed May 29, 2012.

* cited by examiner

*Primary Examiner* — John K Fristoe, Jr.
*Assistant Examiner* — Frederick D Soski
(74) *Attorney, Agent, or Firm* — Marshall, Gerstein & Borun LLP

(57) ABSTRACT

A fail safe retaining plug assembly for a slam-shut safety device includes a reset pin, a retaining plug attached to the reset pin at a proximal portion, and a safety disk attached to the reset pin at a distal portion. The retaining plug assembly is sufficiently long to prevent the safety disk from falling off of the distal portion before the safety disk contacts a valve seat. The retaining plug assembly is also sufficiently long to prevent the retaining plug from falling off of the reset pin before the safety disk contacts the valve seat.

17 Claims, 7 Drawing Sheets

__US 8,616,521 B2__

FAIL SAFE RETAINING PLUG ASSEMBLY FOR A SLAM-SHUT SAFETY DEVICE

BACKGROUND

1. Field of the Disclosure

The disclosure generally relates to slam-shut safety devices for gas distribution systems, and specifically relates to fail safe retaining plug assemblies for slam-shut type safety valves.

2. Related Technology

Gas distribution systems, in particular natural gas distribution systems, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

Typically, these pressure reducing stations include one or more pressure regulating valves and some sort of safety device to shut off the flow of gas should the pressure regulating valve fail. Most commonly, slam-shut safety valves are used for this purpose. For example, U.S. Pat. No. 4,134,421, which is hereby incorporated by reference, discloses a slam-shut safety valve that provides overpressure protection in a pipeline. Another example of a slam-shut safety valve is disclosed in U.S. patent application Ser. No. 12/105,351, which is hereby incorporated by reference herein. The slam-shut safety valve is generally disposed upstream of the pressure regulating valve so that the slam-shut valve may prevent gas from reaching the pressure regulating valve in the event of a pressure regulating valve failure. The slam-shut safety valve monitors gas pressure downstream of the pressure regulating valve for maximum and minimum pressure tolerances. If the downstream pressure exceeds either the maximum or minimum tolerance, the slam-shut safety valve closes, cutting off the flow of gas to the pressure regulating valve and preventing an uncontrolled leak of gas due to the pressure regulating valve failure.

Known slam-shut safety valves have a retaining plug attached to a reset pin. A safety disk is attached to the retaining plug. The safety disk covers a valve orifice in the vicinity of a valve seat when an overpressure or underpressure condition is sensed. The reset pin is attached to an actuator that senses the overpressure or underpressure condition and the reset pin, and thus the safety disk, is spring loaded to an open position.

The safety disk is typically retained on the retaining plug with an e-ring or other similar locking connection. The retaining plug is likewise attached to the reset pin with an e-ring or other locking connection. The e-ring or other locking connection must be removable for valve maintenance or repair so that individual components may be repaired or replaced as needed. However, these removable locking connections, and e-rings in particular, are susceptible to failure when exposed to the fluid pressure moving through the control valve. If the e-ring or other locking connection fails, the safety disk and/or the retaining plug may become disengaged from the reset pin, causing a failure of the slam-shut safety valve. It is essential that the slam-shut safety device remain operational because the slam-shut safety device is attached to the control valve to prevent fluid flow through the control valve in the event of control valve failure.

SUMMARY OF THE DISCLOSURE

A fail safe retaining plug assembly for a slam-shut safety device includes a reset pin, a retaining plug attached to the reset pin at a proximal end, and a safety disk attached to the reset pin at a distal end. The retaining plug assembly is sufficiently long to prevent the safety disk from falling off of the distal end before the safety disk contacts a valve seat. The retaining plug assembly is also sufficiently long to prevent the retaining plug from falling off of the reset pin before the safety disk contacts the valve seat.

A slam-shut safety device having a fail safe retaining plug assembly includes a valve body having a fluid inlet and a fluid outlet connected by a fluid flow path. A valve seat is located within the fluid flow path. A reset pin extends at least partially into the valve body. A retaining plug is attached to the reset pin and the retaining plug includes a distal section and a proximal section. A safety disk attached to the distal section of the retaining plug and the safety disk is slidable with the retaining plug towards and away from the valve seat. When the safety disk contacts the valve seat, fluid flow through the fluid flow path is prevented. The retaining plug is sufficiently long to prevent the safety disk from falling off of the distal section before the safety disk contacts the valve seat. The retaining plug is also sufficiently long to prevent the retaining plug from falling off of the reset pin before the safety disk contacts the valve seat.

BRIEF DESCRIPTION OF THE DRAWINGS

Objects, features, and advantages of the present invention will become apparent upon reading the following description in conjunction with the drawing figures, in which.

DETAILED DESCRIPTION

Figure 1:
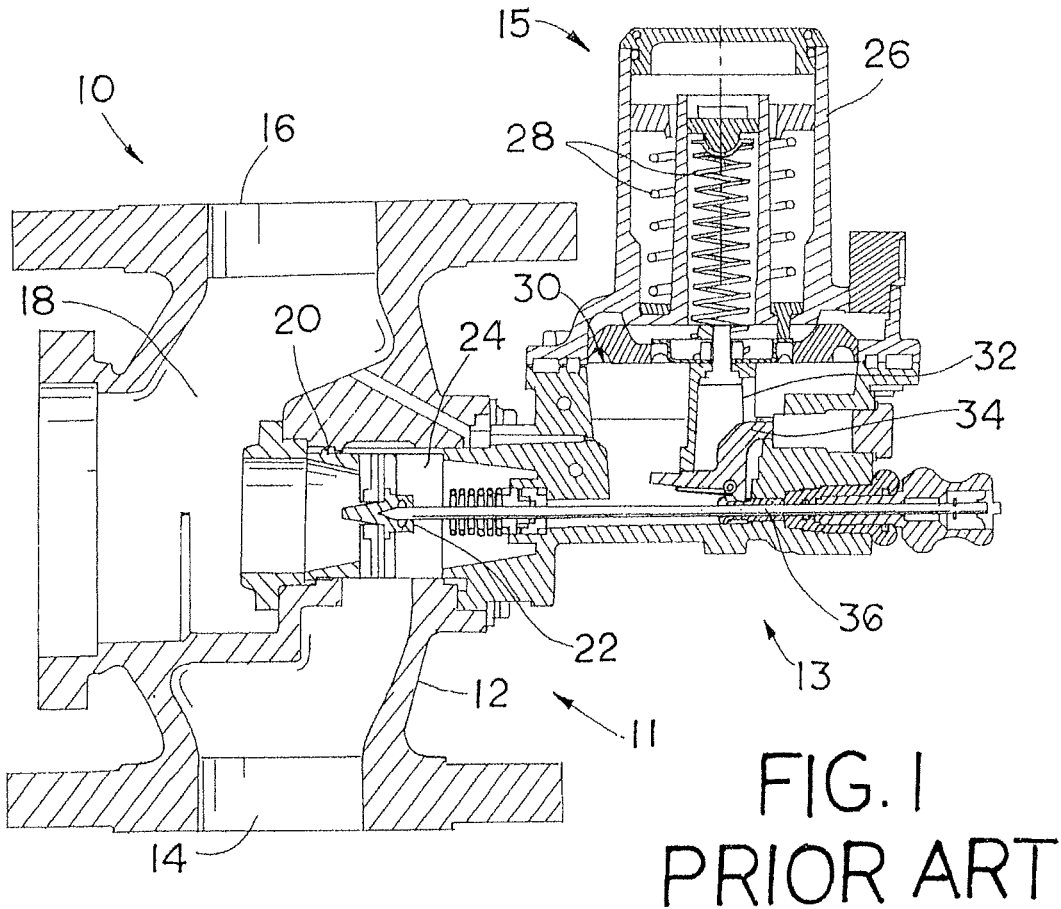
FIG. 1 is a cross-sectional view of a prior art slam-shut safety valve.

Turning now to the figures, FIG. 1 illustrates one example of a known slam-shut safety valve 10. The slam-shut safety device 10 may be attached to a main regulator (not shown) in a gas distribution system to provide a safety shutoff capability in the event of main regulator failure. The slam-shut safety device 10 includes a valve portion 11, a slam-shut portion 13, and an actuator 15. The valve portion 11 includes a valve body 12 having a fluid inlet 14, and a fluid outlet 16 connected by a fluid passage 18. The fluid passage 18 includes a valve seat 20. Fluid flowing through the slam-shut safety device 10 flows from the fluid inlet 14, through the fluid passage 18 including the valve seat 20, to the fluid outlet 16.

The slam-shut portion 13 includes a safety disk 22 that cooperates with the valve seat 20 to restrict fluid flow through the slam-shut safety device 10 when an overpressure or underpressure condition is sensed downstream of the main regulator. The safety disk 22 slides within a cage 24 towards and away from the valve seat 20. Some known slam-shut safety devices 10 may not include a cage 24.

The actuator 15 includes a housing 26 enclosing one or more springs 28. The springs 28 are connected to a diaphragm 30. The diaphragm 30 is sensitive to pressure changes within the actuator 15 and moves within the actuator housing 26 in response to pressure changes. The diaphragm 30 is connected to a back plate 32, which moves longitudinally within the housing 26 in conjunction with the diaphragm 30. The back plate 32 interacts with a cam 34 to release a reset pin 36, which is connected to the safety disk 22, when the actuator 15 senses an overpressure or underpressure condition. Once the reset pin 36 is released, the reset pin 36 and the safety disk 22 slide towards the valve seat 20 under spring pressure, which brings the safety disk 22 into contact with the valve seat 20, thus shutting off fluid flow through the flow path 18.

Figure 3:
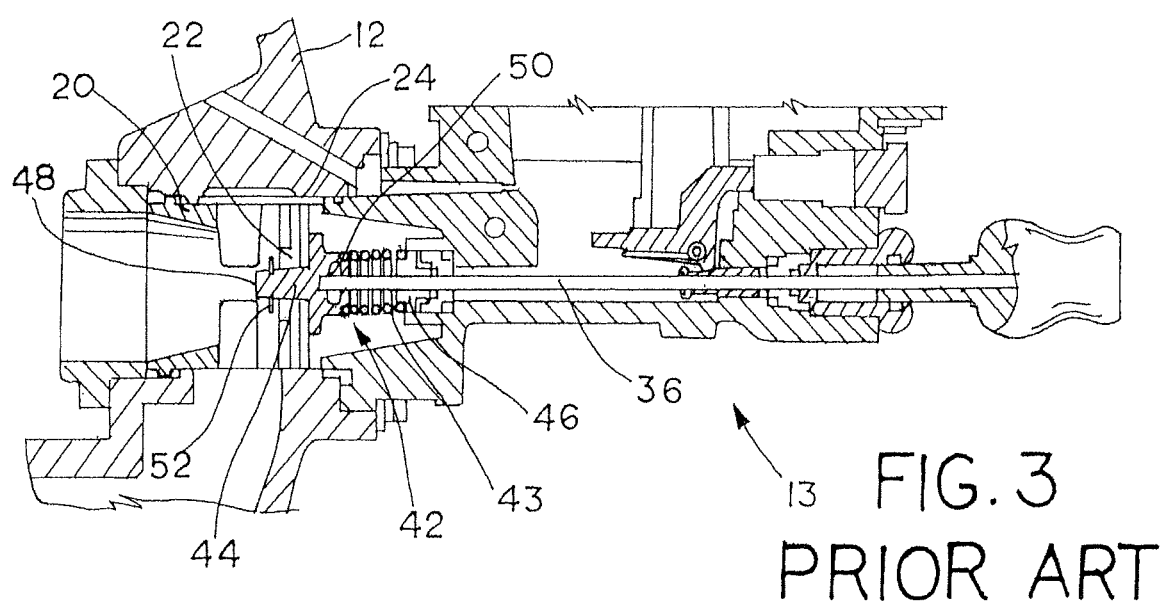
FIG. 3 is a cutaway view of the slam-shut safety valve of FIG. 1 in an open position.
Figure 2:
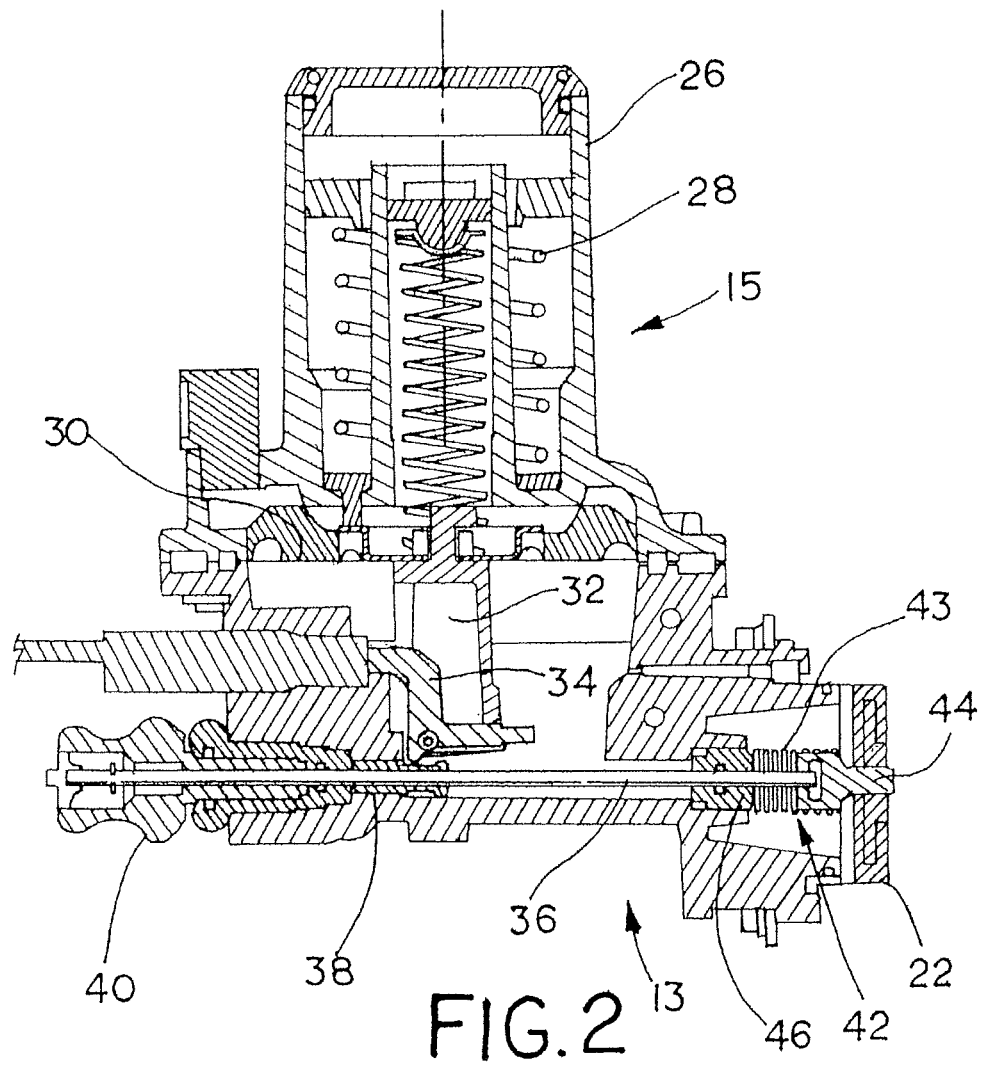
FIG. 2 is a cutaway view of a portion of the slam-shut safety valve of FIG. 1.

FIG. 2 illustrates a close up view of the slam-shut section 13 and the actuator 15 of the slam-shut safety device 10. The slam-shut section 13 includes the reset pin 36, which is connected to the safety disk 22, a latch plug 38, and a reset sleeve 40. The reset sleeve 40 is attached to the reset pin 36, opposite of the safety disk 22. The reset sleeve 40 is used to reset the slam-shut safety device 10 after the slam-shut safety device 10 has been activated due to an overpressure or underpressure condition and the condition has been corrected. The cam 34 releasably holds the latch plug 38 in position, which maintains the safety disk 22 in an armed position, as illustrated in FIG. 3. When the cam 34 is activated by the actuator 15, the cam 34 releases the reset plug 38 and the reset pin 36 and the safety disk 22 slide towards the valve seat 20 to close the slam-shut safety device 10, preventing fluid flow through the flow path 18. Force to move the reset pin 36 and the safety disk 22 is provided by a reset spring 43. The reset spring 43 biases the reset pin 36 and the safety disk 22 towards the valve seat 20 and the reset pin 36 and the safety disk 22 are held in an armed or retracted position by the cam 34 and latch plug 38. The safety disk 22 is attached to the reset pin 36 by a retaining plug assembly 42. The retaining plug assembly 42 includes a retaining plug 44 and a spring locator 46. The retaining plug 44 forms a connection between the reset pin 36 and the safety disk 22.

The retaining plug 44 includes a bore 48 for receiving one end of the reset pin 36. The reset pin 36 may be secured to the retaining plug 44 with a releasable connection, such as a pin e-ring 50. The pin e-ring 50 may be removed during maintenance or repair to allow the reset pin 36 to be removed from the retaining plug 44. Likewise, the safety disk 22 may be releasably secured to the retaining plug 44. by a releasable connection, such as a disk e-ring 52. Releasable connections other than e-rings may be used and one of ordinary skill in the art could choose an appropriate releasable connection based upon valve and fluid characteristics.

Figure 4:
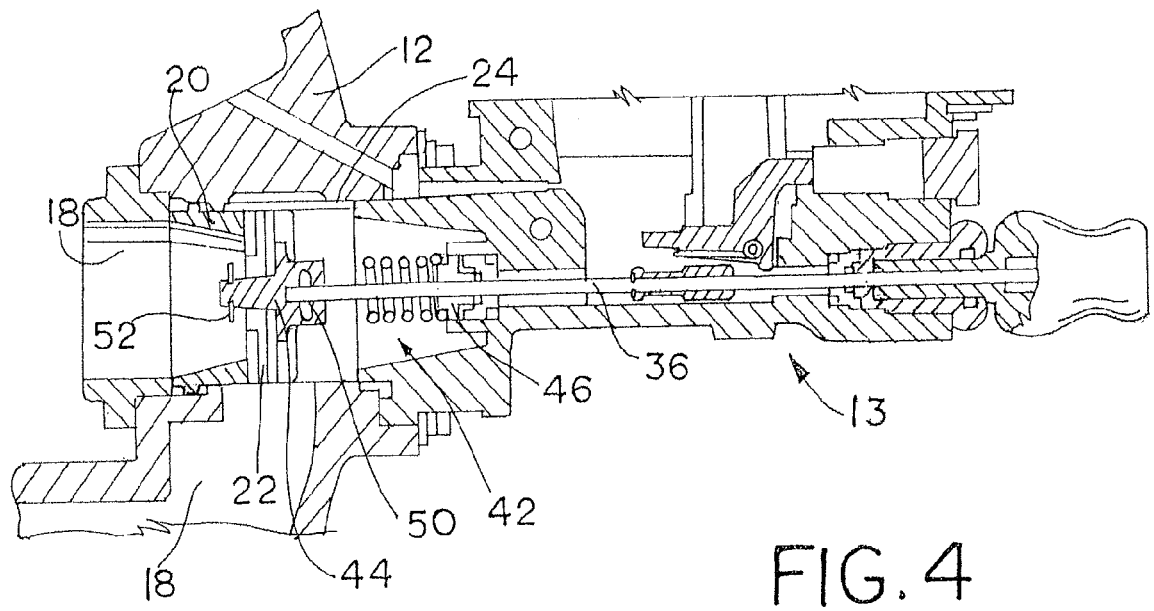
FIG. 4 is a cutaway view of the slam-shut safety valve of FIG. 1 in a closed position.

FIG. 4 illustrates the slam-shut portion 13 in an actuated position, in which the reset pin 36 and safety disk 22 have moved towards the valve seat 20 and the safety disk 22 is engaging the valve seat 20 to prevent fluid flow through the flow path 18.

Figure 5:
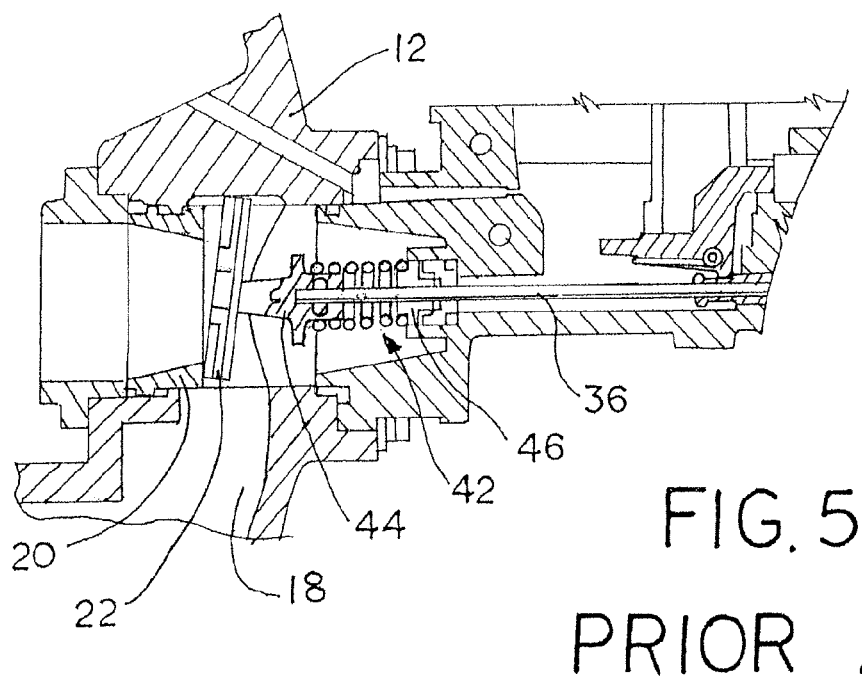
FIG. 5 is cutaway view of the slam-shut safety valve of FIG. 1 with a valve disk dislodged from a retaining plug due to a connector failure.

FIG. 5 illustrates a problem that occurs with known slam-shut safety devices in which the safety disk 22 may become disconnected from the reset pin 36. Because the e-rings 50, 52 are exposed to fluid flow and fluid pressure within the valve body 12, the e-rings 50, 52 may fail. In FIG. 5, the disk e-ring 52 has failed and the disk 22 has been disconnected from the retaining plug 44 and become lodged at an angle within the flow path 18. When the disk 22 becomes disconnected from the retaining plug 44, the slam-shut safety device 10 fails because the safety disk 22 is no longer capable of cooperating with the valve seat 20 to prevent fluid flow through the flow path 18. Additionally, the safety disk 22 may cause damage within the valve body 12 due to misalignment and/or vibration. Although not illustrated in FIG. 5, a similar problem can occur when the pin e-ring 50 fails.

Figure 6:
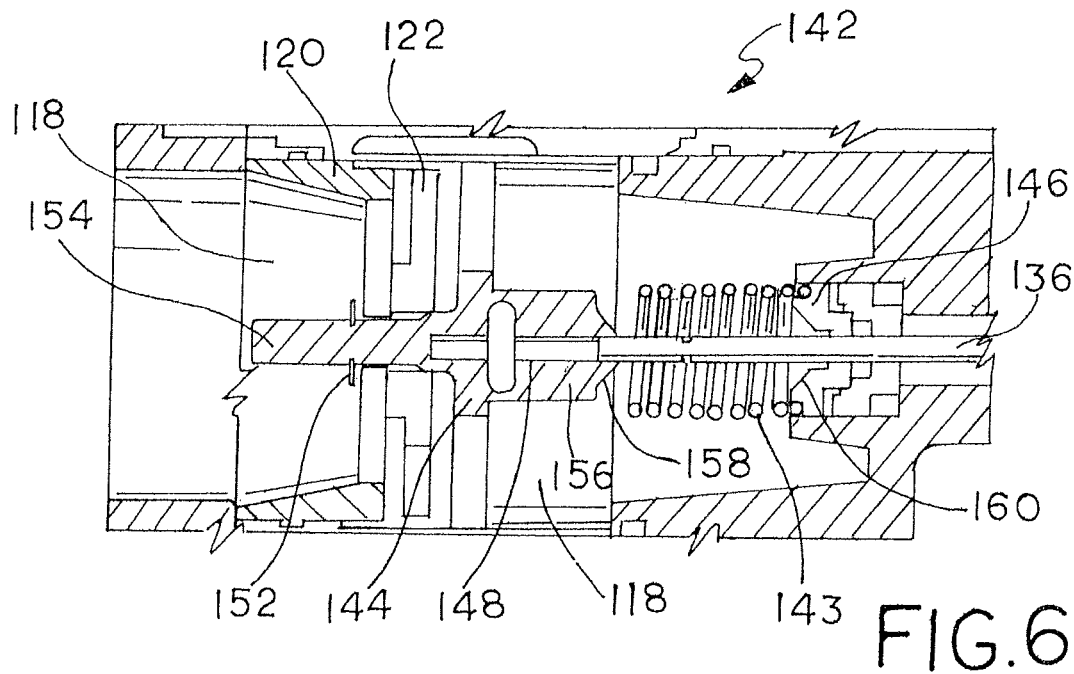
FIG. 6 is a cutaway view of a fail safe retaining plug assembly constructed in accordance with the teachings of the disclosure with a retaining plug connector failure.
Figure 7:
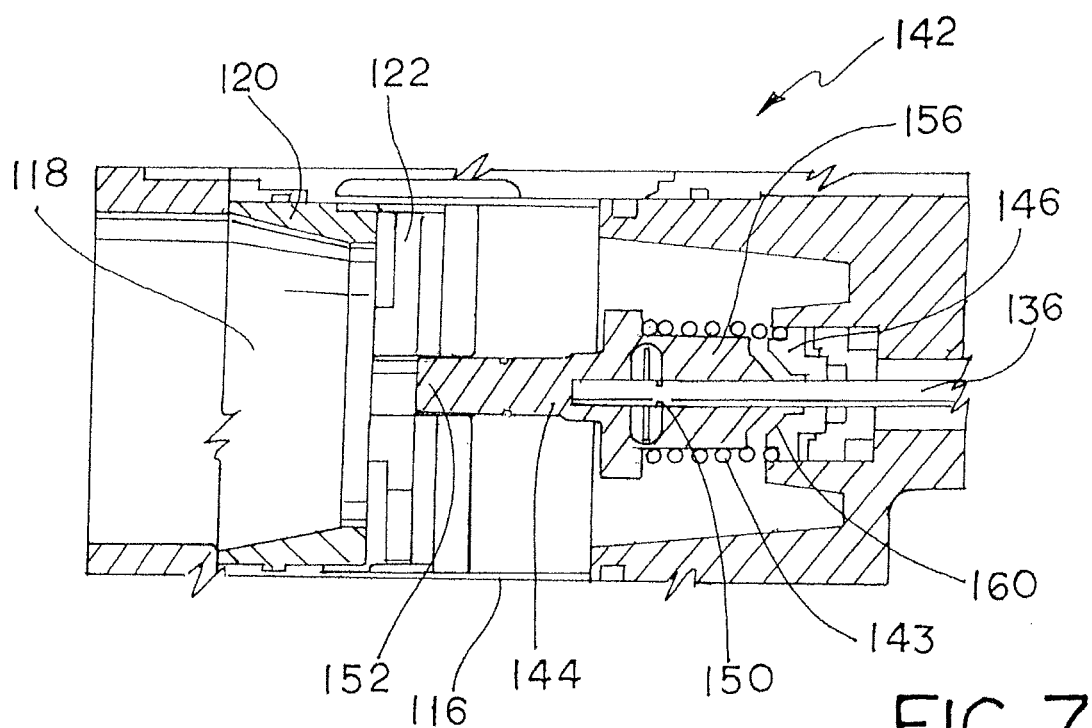
FIG. 7 is a cutaway view of the fail safe retaining plug assembly of FIG. 6 with a disk connector failure.
Figure 8:
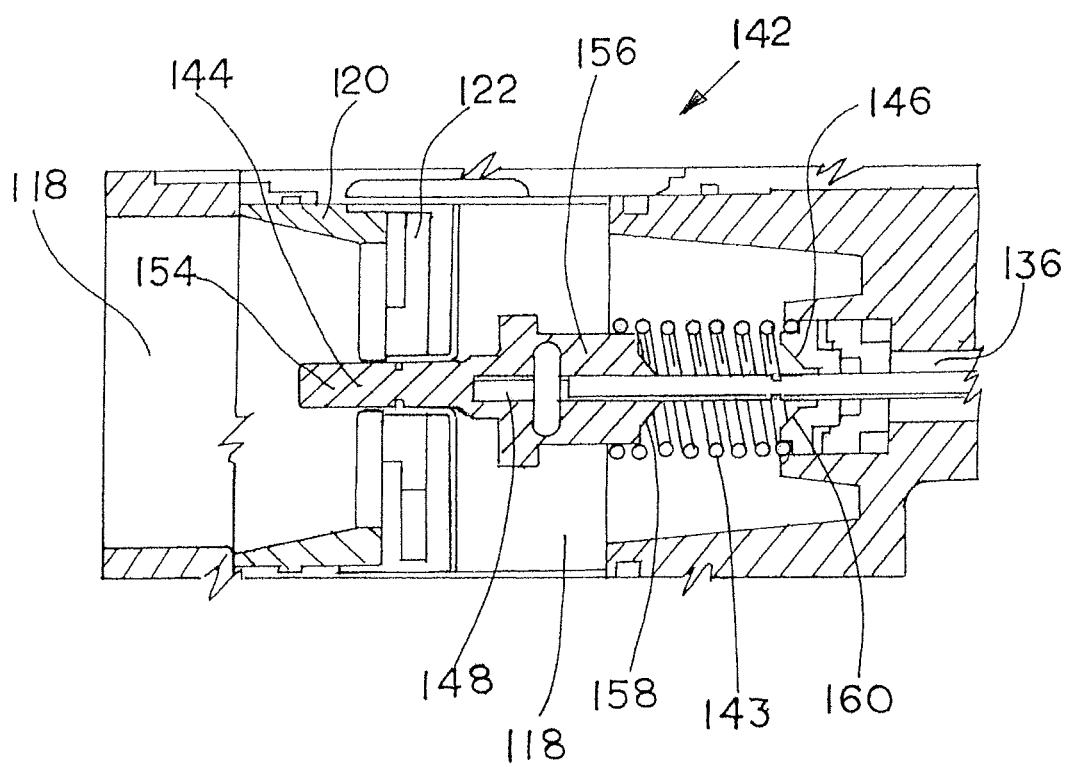
FIG. 8 is a cutaway view of the fail safe retaining plug assembly of FIG. 6 with both a retaining plug connector failure and a disk connector failure.

FIGS. 6-8 illustrate a fail safe retaining plug assembly 142 constructed in accordance with the teachings of the disclosure, wherein like elements are numbered 100 greater than corresponding elements in FIGS. 1-5. The fail safe retaining plug assembly 142 includes a reset pin 136, a retaining plug 144 attached to the reset pin 136, a spring locator 146, and a reset spring 143 located between the spring locator 146 and the retaining plug 144 to bias the retaining plug 144 and safety disk 122 towards a valve seat 120.

The retaining plug 144 includes a lengthened distal section 154 and a lengthened proximal section 156. The proximal section 156 includes a lengthened bore 148 for receiving the reset pin 136. The proximal section 156 also includes a conical portion 158 that fits at least partially within a conical recess 160 in the spring locator 146 when the retaining plug 144 is in an armed position. By lengthening the retaining plug 144 on both the proximal end and the distal end, the safety disk 122 remains located on the distal section 154 regardless of pin e-ring or disk e-ring failure. The reset pin 136 is also lengthened for proper seating within the lengthened bore 148. The overall length of the retaining plug 144 is sufficient to prevent the safety disk 122 from falling off of the distal end of the retaining plug in the event of disk e-ring 152 failure. The overall length of the retaining plug 144 is also sufficient to prevent the retaining plug 144 from falling off of the reset pin 136 in the event of pin e-ring 150 failure FIG. 6 specifically illustrates a situation in which the pin e-ring 150 has failed. When the pin e-ring 150 fails, the retaining plug 144 is free to slide along the reset pin 136. The retaining plug 144 and the safety disk 122 will generally be forced towards the valve seat 120 due to fluid pressure within the flow path 118. The lengthened proximal portion 156 of the retaining plug 144 is sufficiently long to prevent the retaining plug 144 from sliding completely off of the reset pin 136 before the safety disk 122 contacts the valve seat. In other words, the retaining plug 144 is sufficiently long to maintain a proper alignment between the safety disk 122 and the valve seat 120 in the event of pin e-ring 150 failure.

FIG. 7 specifically illustrates a situation in which the disk e-ring 152 has failed. When the disk e-ring 152 fails, the safety disk 122 is free to slide along the distal section 154 of the retaining plug. The safety disk 122 will generally be forced towards the valve seat 120 due to fluid pressure within the flow path 118. The distal section 154 is sufficiently long to prevent the disk 122 from falling off of the distal section 154 before the disk 122 contacts the valve seat 120. In other words, the retaining plug 144 is sufficiently long to maintain proper alignment between the safety disk 122 and the valve seat 120 in the event of disk e-ring 152 failure.

FIG. 8 specifically illustrates failure of both the disk e-ring 152 and the pin e-ring 150. When both the disk e-ring 152 and the pin e-ring 150 fail, the disk 122 is free to slide along the distal section 154 and the retaining plug 144 is free to slide on then reset pin 136. The total length of the lengthened distal section 154 and the lengthened proximal section 156 is sufficient to prevent both the safety disk 122 from falling off of the distal section 154 and the retaining plug 144 from falling off of the reset pin 136 before the safety disk 122 contacts the valve seat 120. In other words, the retaining plug 144 is sufficiently long to maintain proper alignment between the safety disk 122 and the valve seat 120 in the event of both pin e-ring 150 failure and disk e-ring 152 failure.

Figure 9A:
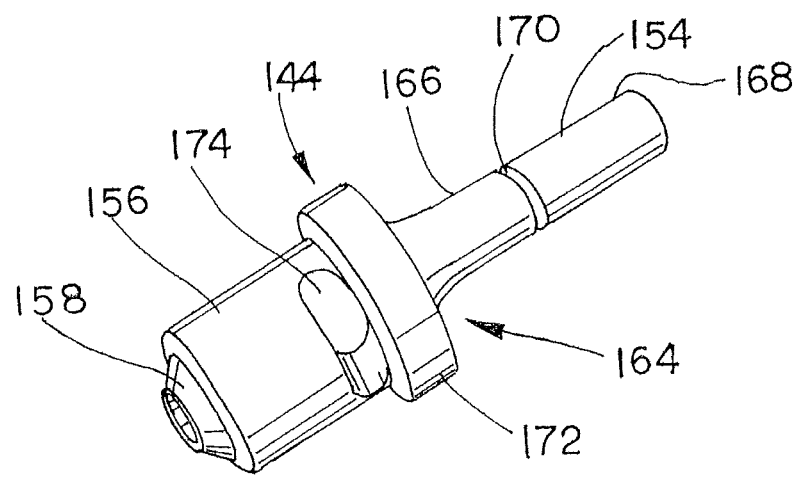
FIGS. 9A-9C are perspective, plan, and cross-sectional views of the retaining plug of FIG. 6.
Figure 9B:
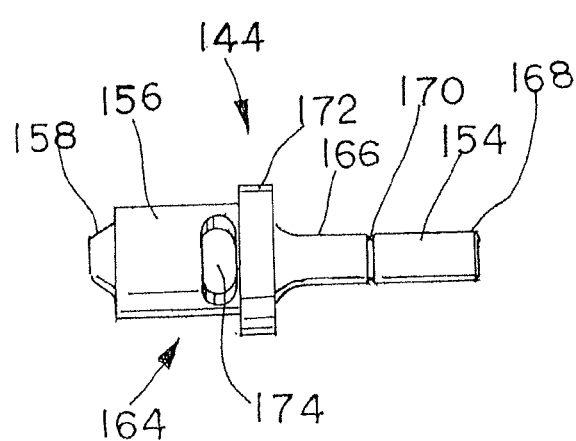
Figure 9C:
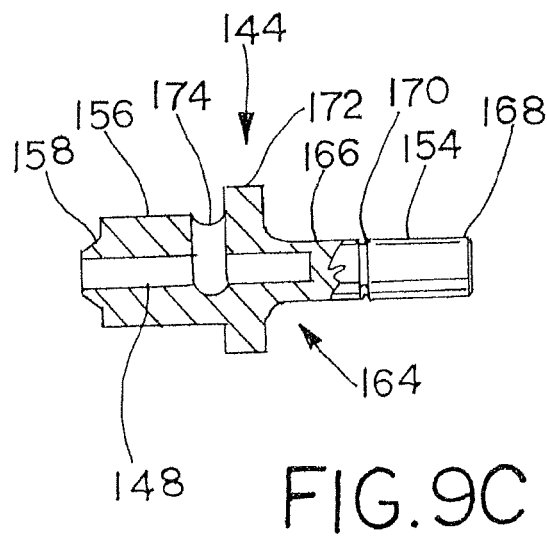

FIGS. 9A-9C illustrate one embodiment of the retaining plug 144 in which the retaining plug 144 includes a body 164 comprising the lengthened proximal section 156 and the lengthened distal section 154. The proximal section 156 is generally cylindrical in shape terminating in the conical portion 158. The distal section 154 includes a first distal portion 166 and a second distal portion 168 separated by an annular recess 170. The second distal portion 168 is at least as long as the first distal portion 166. The annular recess 170 is sized to receive the disk e-ring 152. The safety disk 122 is positioned between the annular recess 170 and a spring seat flange 172. The spring seat flange 172 provides a seating surface for the reset spring 143 to seat against and thus bias the retaining plug 144 towards the valve seat 120. The bore 148 extends completely through the lengthened proximal section 156, terminating in the distal section 154 near the spring seat flange 172. An e-ring opening 174 extends substantially perpendicular to the bore 148 and is sized to receive the pin e-ring 150 for securing the retaining plug 144 to the reset pin 136.

Figure 10A:
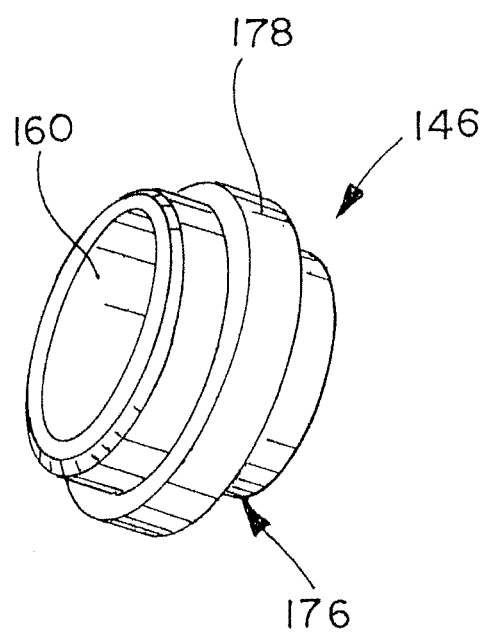
FIGS. 10A-10C are perspective, plan, and cross-sectional views of a spring locator of the retaining plug assembly of FIG. 6.
Figure 10B:
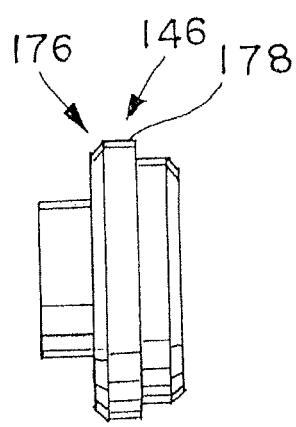
Figure 10C:
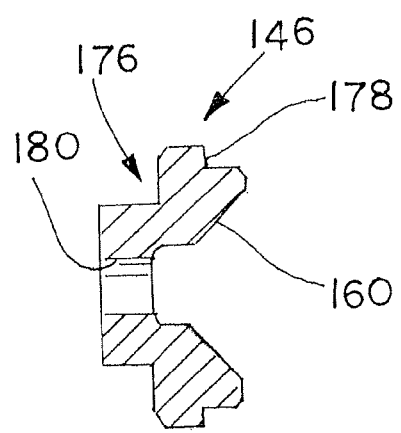

FIGS. 10A-10C illustrate one embodiment of the spring locator 146 in which the spring locator 146 includes a locator body 176 comprising the conical recess 160, a spring seat flange 178, and a central bore 180. As described above, the conical recess 160 is sized to receive at least a portion of the conical portion 158 of the retaining plug 144 when the reset spring 143 is compressed. Thus, the conical recess 160 and the conical portion 158 cooperate to allow the retaining plug 144 to be moved much closer to the spring locator 146 than in prior art slam-shut valves. More particularly, the conical recess 160 essentially overlaps a portion of the conical portion 158 when the retaining plug 144 is in an armed position with the reset pin 143 compressed. Moreover, the conical recess 160 allows a longer proximal section 156 to be used, which results in less likelihood of the retaining plug 144 falling off of the reset pin 136.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A retaining plug assembly for a slam-shut safety device, the retaining plug assembly comprising:
a reset pin;
a retaining plug attached to the reset pin, the retaining plug including a distal section and a proximal section, the proximal section including a conical portion;
a spring retainer, the reset pin extending through a bore in the spring retainer;
a reset spring disposed between the spring retainer and the retaining plug; and
a safety disk attached to the distal section of the retaining plug
wherein the spring retainer includes a conical recess sized to receive at least part of the conical portion of the retaining plug.

2. The retaining plug assembly of claim 1, wherein the retaining plug includes a first flange and the spring retainer includes a second flange, the reset spring being disposed between the first flange and the second flange.

3. The retaining plug assembly of claim 1, wherein the proximal section of the retaining plug is secured to the reset pin with an e-ring.

4. The retaining plug assembly of claim 1, wherein the safety disk is attached to the distal section of the retaining plug with an e-ring.

5. The retaining plug assembly of claim 1, wherein the retaining plug is sufficiently long to prevent the safety disk from falling off of the distal section before the safety disk contacts a valve seat in a slam-shut safety device.

6. The retaining plug assembly of claim 1, wherein the distal section includes a first distal portion and a second distal portion separated by an annular recess.

7. A retaining plug assembly for a slam-shut safety device, the retaining plug assembly comprising:
a reset pin;
a retaining plug attached to the reset pin, the retaining plug including a distal section and a proximal section, the proximal section including a conical portion; and
a safety disk attached to the distal section of the retaining plug,
wherein the distal section includes a first distal portion and a second distal portion separated by an annular recess, and
wherein the first distal portion is located between the annular recess and a reset spring flange, and the second distal portion is at least as long as the first distal portion.

8. The retaining plug assembly of claim 1, wherein the retaining plug includes a bore for receiving a portion of the reset pin, the bore extending through the proximal section, the bore terminating in the distal section.

9. The retaining plug assembly of claim 8, wherein the retaining plug includes an e-ring opening that is substantially perpendicular to the bore, the e-ring opening being sized to receive at least a portion of an e-ring that secures the retaining plug to the reset pin.

10. The retaining plug assembly of claim 8, wherein the bore terminates proximate a flange.

11. The retaining plug assembly of claim 8, wherein the bore is sufficiently long to prevent the retaining plug from falling off of the reset pin before the safety disk contacts a valve seat in a slam-shut safety device.

12. A slam-shut safety device for a fluid distribution network, the slam-shut safety device comprising:
a valve body having a fluid inlet and a fluid outlet connected by a fluid flow path;
a valve seat located within the fluid flow path;
a reset pin;
a retaining plug attached to the reset pin, the retaining plug including a distal section and a proximal section;
a spring locator and a reset spring disposed between the retaining plug and the spring locator, the reset spring biasing the retaining plug towards the valve seat; and
a safety disk attached to the distal section of the retaining plug,
wherein the reset pin is slide able towards and away from the valve seat so that the safety disk also slides towards and away from the valve seat and in a closed position, the safety disk contacts the valve seat to prevent fluid flow through the fluid flow path, and a length of the retaining plug is sufficient to prevent the safety disk from falling off of the distal section before the safety disk contacts the valve seat.

13. The slam-shut safety device of claim 12, wherein the retaining plug includes a conical portion on the proximal section and the spring locator includes a conical recess, the conical recess being sized to receive at least part of the conical portion.

14. The slam-shut safety device of claim 12, wherein the distal section includes a first distal portion and a second distal portion, the first distal portion being located between an annular recess and a spring seat flange on the retaining plug, the second distal portion being at least as long as the first distal portion.

15. The slam-shut safety device of claim 12, wherein the retaining plug includes a bore for receiving a portion of the reset pin, the bore being sufficiently long to prevent the retaining plug from falling off of the reset pin before the safety disk contacts the valve seat.

16. The slam-shut safety device of claim 15, wherein the retaining plug includes an e-ring opening substantially perpendicular to the bore.

17. The slam-shut safety device of claim 15, wherein the bore extends through the proximal section and terminates in the distal section.

\* \* \* \* \*

UNITED STATES PATENT AND TRADEMARK OFFICE
CERTIFICATE OF CORRECTION

PATENT NO. : 8,616,521 B2  
APPLICATION NO. : 13/087771  
DATED : December 31, 2013  
INVENTOR(S) : Woollums et al.

Page 1 of 1

It is certified that error appears in the above-identified patent and that said Letters Patent is hereby corrected as shown below:

In the Specification:

At Column 3, line 58, "plug 44." should be -- plug 44 --.

In the Claims:

At Column 5, line 64, "plug" should be -- plug, --.

Signed and Sealed this  
Twenty-second Day of December, 2015

Michelle K. Lee  
*Director of the United States Patent and Trademark Office*